United States Patent
Kamruzzaman

(10) Patent No.: US 10,289,558 B2
(45) Date of Patent: May 14, 2019

(54) APPARATUS AND METHOD FOR REDUCING STORAGE CLASS MEMORY WRITE-BACKS

(71) Applicant: HGST Netherlands B.V., Amsterdamn (NL)

(72) Inventor: Md Kamruzzaman, Cupertino, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 637 days.

(21) Appl. No.: 15/061,595

(22) Filed: Mar. 4, 2016

(65) Prior Publication Data

US 2017/0255563 A1  Sep. 7, 2017

(51) Int. Cl.
*G06F 12/0891* (2016.01)
*G06F 12/0897* (2016.01)

(52) U.S. Cl.
CPC ...... *G06F 12/0897* (2013.01); *G06F 12/0891* (2013.01); *G06F 2212/1021* (2013.01)

(58) Field of Classification Search
CPC ....... G06F 12/123–128; G06F 12/0897; G06F 2212/1021; G06F 12/0891
See application file for complete search history.

(56) References Cited

U.S. PATENT DOCUMENTS

| | | | |
|---|---|---|---|
| 5,895,488 A * | 4/1999 | Loechel | G06F 12/0804 711/135 |
| 6,119,205 A | 9/2000 | Wicki et al. | |
| 6,772,298 B2 | 8/2004 | Khare et al. | |
| 7,177,983 B2 | 2/2007 | Royer | |
| 7,380,070 B2 | 5/2008 | Tan | |
| 7,788,423 B2 | 8/2010 | Daly, Jr. et al. | |
| 8,924,652 B2 | 12/2014 | Habusha et al. | |
| 8,949,541 B2 | 2/2015 | Glasco et al. | |
| 9,098,327 B2 | 8/2015 | Wang | |

(Continued)

OTHER PUBLICATIONS

Hoyoung Jung, Hyoki Shim, Sungmin Park, Sooyong Kang and Jaehyuk Cha; LRU-WSR: Integrationof LRU and Writes Sequence Reordering for Flash Memory; Jun. 10, 2008; IEEE 0098 3063/08 pp. 1215-1223 (Year: 2008).*

(Continued)

*Primary Examiner* — Reginald G Bragdon
*Assistant Examiner* — Hannah A Faye
(74) *Attorney, Agent, or Firm* — Morgan, Lewis & Bockius LLP

(57) ABSTRACT

Embodiments of the present disclosure perform procedures that manipulate a memory system's local cache line eviction policy so that critical "dirty" cache lines are evicted from last level caches as late as possible. Embodiments can selectively handle cache lines in a manner that can renew the liveliness of "dirty" cache lines so that a local "least recently used" (LRU) eviction policy treats them as though they were recently accessed rather than evicting them. Embodiments perform read operations and manipulate the age or "active" status of cache lines by performing procedures which modify "dirty" cache lines to make them appear active to the processor. Embodiments of the present disclosure can also invalidate "clean" cache lines so that "dirty" lines automatically stay in the cache.

14 Claims, 9 Drawing Sheets

(56) References Cited

U.S. PATENT DOCUMENTS

| | | |
|---|---|---|
| 2004/0083341 A1* | 4/2004 | Robinson .............. G06F 12/126 711/133 |
| 2005/0193176 A1 | 9/2005 | Edirisooriya et al. |
| 2015/0019823 A1 | 1/2015 | Wang et al. |
| 2015/0026404 A1 | 1/2015 | Lilly et al. |
| 2015/0067266 A1 | 3/2015 | Jafri et al. |

OTHER PUBLICATIONS

DRAM-Aware Last-Level Cache Writeback http://repository.cmu.edu/ece/405 Abstract only—Jul. 15, 2015.

Lee et al., "DRAM-Aware Last-Level Cache Writeback: Reducing Write-Caused Interference in Memory Systems," 2010, retrieved from http://repository.cmu.edu/ece/405, Apr. 2010, 22 pages.

\* cited by examiner

Hardware Configuration of Memory Storage System

Software Configuration of Memory Storage System

| Data Structure 202 | | | | |
|---|---|---|---|---|
| Cache Line | Current Cache Line Status | Current Modification Status | Cache Memory Level | ... |
| Cache Line 201 | Inactive | Dirty | Level 1 | ... |
| Cache Line 202 | Inactive | Dirty | Level 1 | ... |
| Cache Line 203 | Inactive | Clean | Level 1 | ... |
| Cache Line 204 | Inactive | Dirty | Level 1 | ... |
| ⋮ | ⋮ | ⋮ | ⋮ | ⋮ |
| Cache Line 220 | Inactive | Clean | Level 2 | ... |
| Cache Line 221 | Inactive | Dirty | Level 2 | ... |
| Cache Line 222 | Inactive | Dirty | Level 2 | ... |
| Cache Line 223 | Inactive | Clean | Level 2 | ... |
| ⋮ | ⋮ | ⋮ | ⋮ | ⋮ |

APPARATUS AND METHOD FOR REDUCING STORAGE CLASS MEMORY WRITE-BACKS

TECHNICAL FIELD

The present disclosure relates generally to the field of memory storage technology.

BACKGROUND OF INVENTION

Emerging storage class memory technologies, such as PCM, STT-RAM, etc., fit well in conventional processor-memory hierarchies due to their ability to reduce read latencies. However, the ability of these conventional hierarchies to reduce write latencies continues to be problematic because any delay in performing write operations can directly impact the performance of an application. The ability of these hierarchies to reduce the total number of writes to storage class memory is critical, both from a performance perspective as well as from an endurance perspective.

Similarly, write frequency in the processor memory hierarchy is several orders of magnitude higher than that which is done on the persistence storage. Thus, when storage class memory (SCM) is used as a DRAM replacement or in a hybrid main memory system, it is critical to control the total number of writes as well as limit the write bandwidth requirements.

SUMMARY OF THE INVENTION

Accordingly, a need exists for a solution that controls the total number of writes as well as limits the write bandwidth requirements for a given memory storage system. Embodiments of the present disclosure perform procedures that manipulate a memory system's local cache line eviction policy so that critical "dirty" cache lines are evicted from last level caches as late as possible.

Embodiments of the present disclosure can selectively handle cache lines in a manner that can renew the liveliness of "dirty" cache lines so that a local, "least recently used" (LRU) eviction policy treats them as though they were recently accessed rather than evicting them. Embodiments of the present disclosure perform read operations and manipulate the age or "active" status of cache lines by performing procedures which modify "dirty" cache lines to make them appear active to the processor. Embodiments of the present disclosure can also invalidate "clean" cache lines so that "dirty" lines automatically stay in the cache.

BRIEF DESCRIPTION OF THE DRAWINGS

The accompanying drawings, which are incorporated in and form a part of this specification, and in which like numerals depict like elements, illustrate embodiments of the present disclosure and, together with the description, serve to explain the principles of the disclosure.

FIG. 2 depicts an exemplary data structure used for storing data related to reducing store class memory write-backs in accordance with embodiments of the present disclosure.

DETAILED DESCRIPTION

Figure 1A:
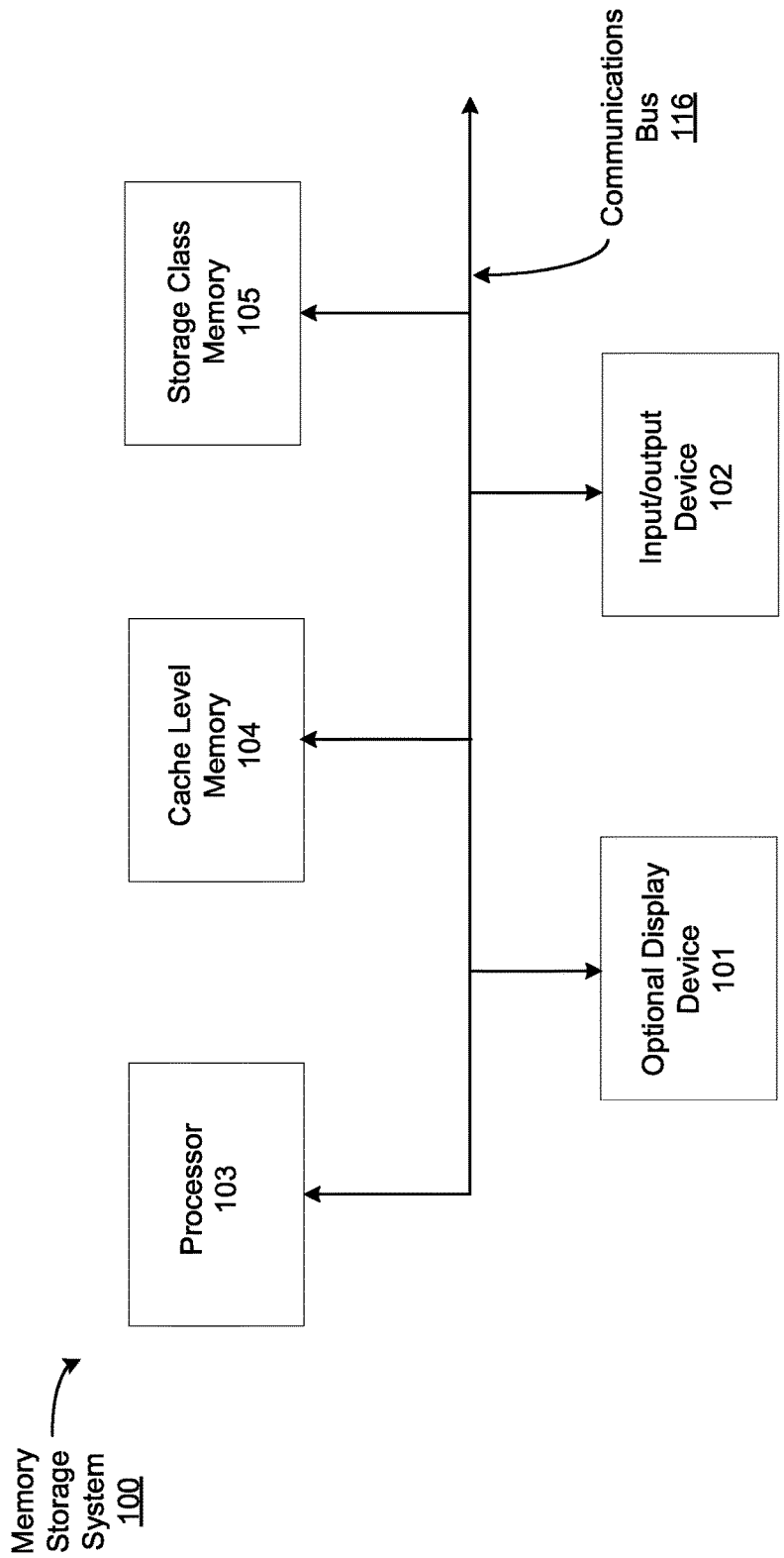
FIG. 1A is a block diagram depicting an exemplary hardware configuration of a memory storage system capable of reducing store class memory write-backs in accordance with embodiments of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps.

It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "selecting" or "identifying" or "activating" or the like, refer to the action and processes of a computer system, or similar electronic computing device, that manipulates and transforms data represented as physical (e.g., electronic) quantities within the computer system's registers and memories and other computer readable media into other data similarly represented as physical quantities within the computer system memories or registers or other such information storage, transmission, or display devices. When a component appears in several embodiments, the use of the same reference numeral signifies that the component is the same component as illustrated in the original embodiment.

Exemplary Memory Storage System for Reducing Main Memory Write-Backs

FIG. 1A is a block diagram depicting an exemplary hardware configuration of an exemplary memory storage system capable of reducing main memory write-back procedures in accordance with embodiments of the present disclosure. Although specific components are disclosed in FIG. 1A, it should be appreciated that such components are exemplary. That is, embodiments of the present invention are well-suited to having various other hardware components or variations of the components recited in FIG. 1A. It is appreciated that the hardware components in FIG. 1A can operate with components other than those presented, and that not all of the hardware components described in FIG. 1A are required to achieve the goals of the present invention. According to some embodiments, components depicted within FIG. 1A can be combined to achieve the goals of the present invention.

Memory storage system 100 can be implemented as an electronic device capable of communicating with other electronic devices over a data communications bus. For example, communications bus 116 depicts such a data communications bus. The exemplary memory storage system 100, upon which embodiments of the present disclosure may be implemented, includes a general purpose computing system environment.

In its most basic configuration, memory storage system 100 typically includes, at minimum, processor 103, cache level memory unit 104, and storage class memory unit 105. Depending on the exact configuration and type of device, storage class memory unit 105 can be volatile (such as RAM), non-volatile (such as ROM, flash memory), or some combination of the two. Portions of storage class memory unit 105, when executed, facilitate efficient execution of memory operations or requests for groups of threads. In some embodiments, the cache level memory unit 104 and storage class memory unit 105 function as a single unit in which cache level memory unit 104 is partitioned as a section within storage class memory unit 105.

In one embodiment, processor 103 is a programmable circuit configured to reduce storage class memory write-back procedures in the manner described herein. For instance, processor 103 includes the functionality to manage data stored in memory devices electronically coupled to memory storage system 100, such as cache level memory unit 104 and/or storage class memory unit 105. In this fashion, processor 103 keeps frequently accessed data, such as cache line data, in memory caches using one or more core processors (described in greater detail infra) to avoid performing memory access procedures that involve using storage class memory unit 105. Thus, when data is not found in a memory cache resident on memory storage system 100, processor 103 includes the functionality to bring it from storage class memory unit 105 and keep it in the cache.

In some embodiments, processor 103 can be a FPGA controller or a flash memory device controller. Also, in one embodiment, processor 103 is operable to reduce storage class memory write-back procedures using a program stored in storage class memory unit 105 and configured to perform functions described herein (see, e.g., FIG. 1B discussed infra). In some embodiments, memory storage system 100 includes an optional display device 101 for presenting information to the computer user, such as by displaying information on a display screen. As depicted in FIG. 1A, memory storage system 100 also includes an optional alpha-numeric input/output device 102. In some embodiments, input/output device 102 includes an optional cursor control or directing device and one or more signal communication interfaces, such as a network interface card.

Additionally, memory storage system 100 may also have additional features and functionality. For example, in one embodiment, memory storage system 100 also includes additional storage media (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data.

Figure 1B:
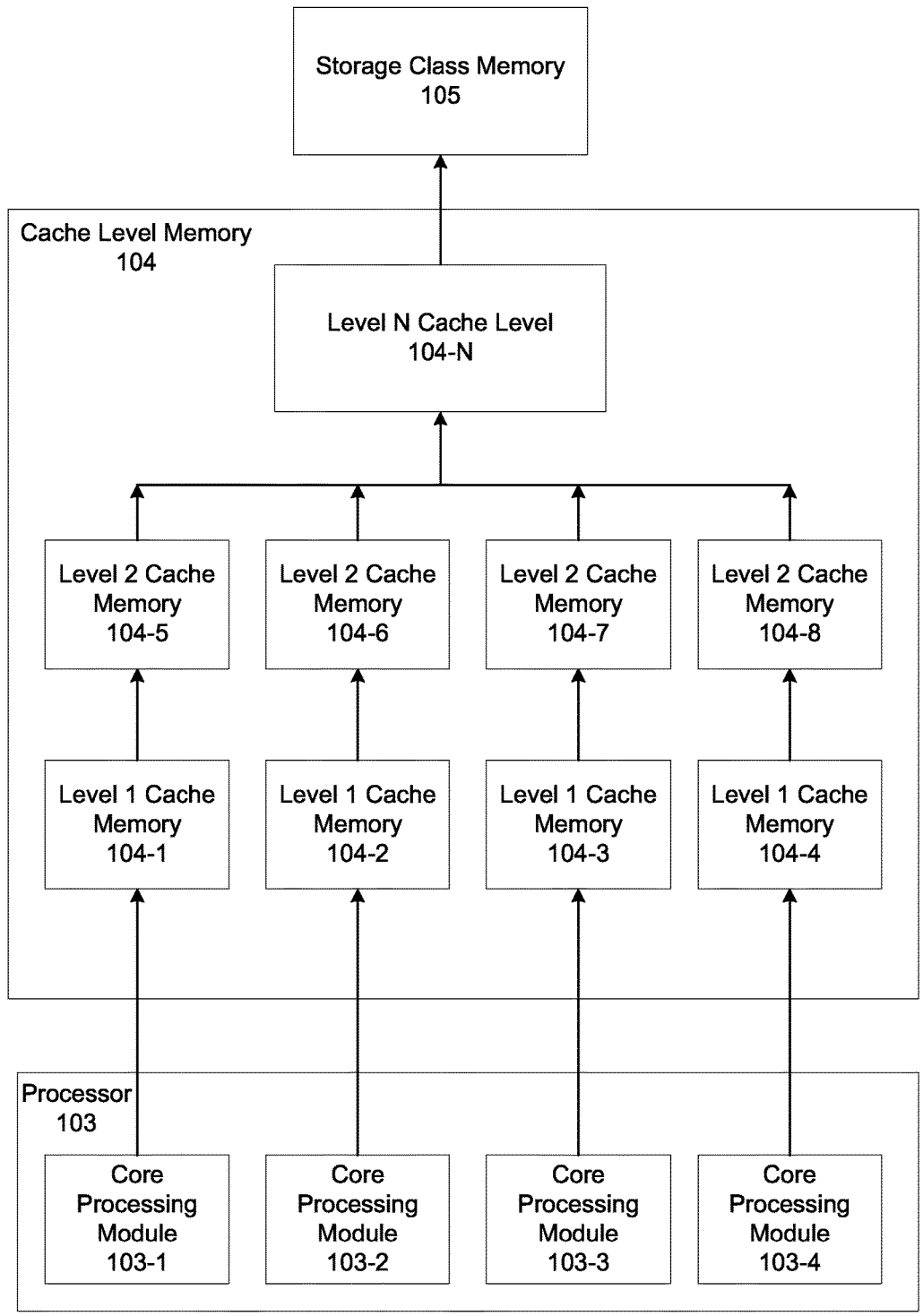
FIG. 1B is a block diagram depicting an exemplary processor-memory hierarchy within memory storage system in accordance with embodiments of the present disclosure.

FIG. 1B is a block diagram depicting an exemplary processor-memory hierarchy within memory storage system 100 in accordance with embodiments of the present disclosure. As depicted in FIG. 1B, processor 103 includes a plurality of different core processing modules, such as core processor modules 1034, 103-2, 103-3, and 103-4. Also, as illustrated in FIG. 1B, core processing modules 103-1, 103-2, 103-3, and 103-4 each include the functionality to access level 1 cache memory units 104-1, 104-2, 104-3, and 104-4. In this fashion, level 1 cache memory units 1044, 104-2, 104-3, and 104-4 can process cache data that to be executed by a corresponding core processing module, such as core processing modules 103-1, 103-2, 103-3, and 103-4.

With further reference to the embodiment depicted in FIG. 1B, core processing modules 103-1, 103-2, 103-3, and 103-4 each include the functionality to access level 2 cache memory units, such as level 2 cache memory devices 104-5, 104-6, 104-7, and 104-8. As such, level 2 cache memory devices 104-5, 104-6, 104-7, and 104-8 each include the functionality to process cache data to be executed by a corresponding core processing module, such as core processing modules 103-1, 103-2, 103-3, and/or 103-4, respectively.

In some embodiments, level 1 cache memory units 1044, 104-2, 104-3, and/or 104-4 include the functionality to access data at a faster rate relative to level 2 cache memory units 104-5, 104-6, 104-7, and/or 104-8. In some embodiments, level 2 cache memory units 104-5, 104-6, 104-7, and 104-8 each include the functionality to store more data relative to level 1 cache memory units 104-1, 104-2, 104-3, and 104-4.

Figure 1C:
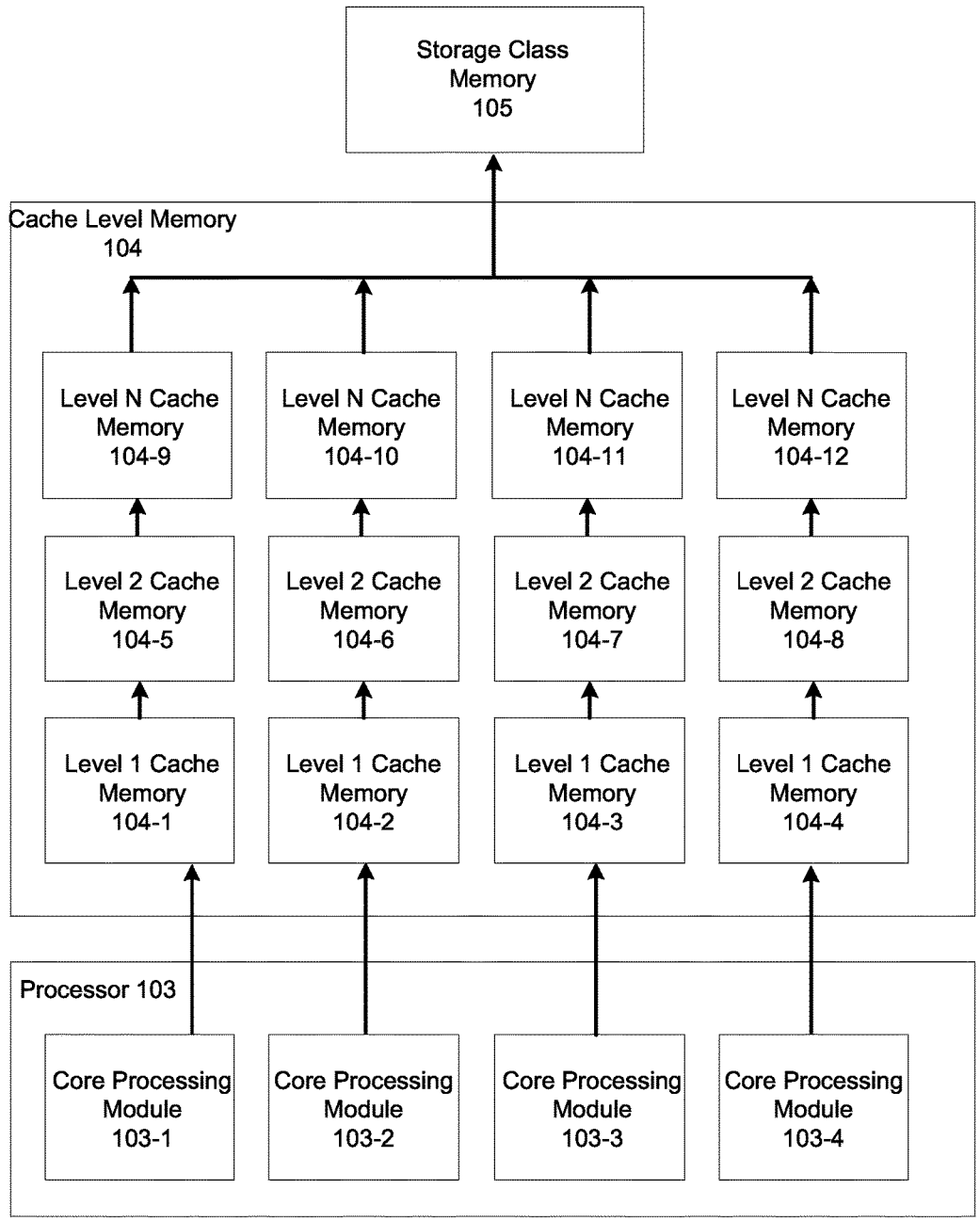
FIG. 1C is a block diagram depicting another exemplary processor-memory hierarchy within memory storage system in accordance with embodiments of the present disclosure.

With further reference to the embodiment depicted in FIG. 1B, core processing modules 103-1, 103-2, 103-3, and 103-4 each include the functionality to access a shared cache memory unit, such as level N cache memory unit 104-N. As such, level N cache memory unit 104-N caches data to be executed by a corresponding core processing module, such as core processing modules 103-1, 103-2, 103-3, and/or 103-4. Relative to level 1 cache memory units 104-1, 104-2, 104-3, and 104-4 and/or level 2 cache memory units 104-5, 104-6, 104-7, and 104-8, level N cache memory unit 104-N performs higher level cache memory operations. In this manner, levelN cache memory unit 104-N can serve as a last level cache unit within cache level memory unit 104. It should be appreciated that in some embodiments, such as FIG. 1C, memory storage system 100 includes additional cache level memory units, such as level 3 cache memory units 104-9, 104-10, 104-11, and/or 104-12 that are accessible to core processor modules 103-1, 103-2, 103-3, and/or 103-4 that includes the same functionality as level cache memory units described herein. In such embodiments, multiple hardware threads may be executed by a shared core processing module. In this fashion, both main thread data and helper threads share some level of cache memory.

Figure 1D:
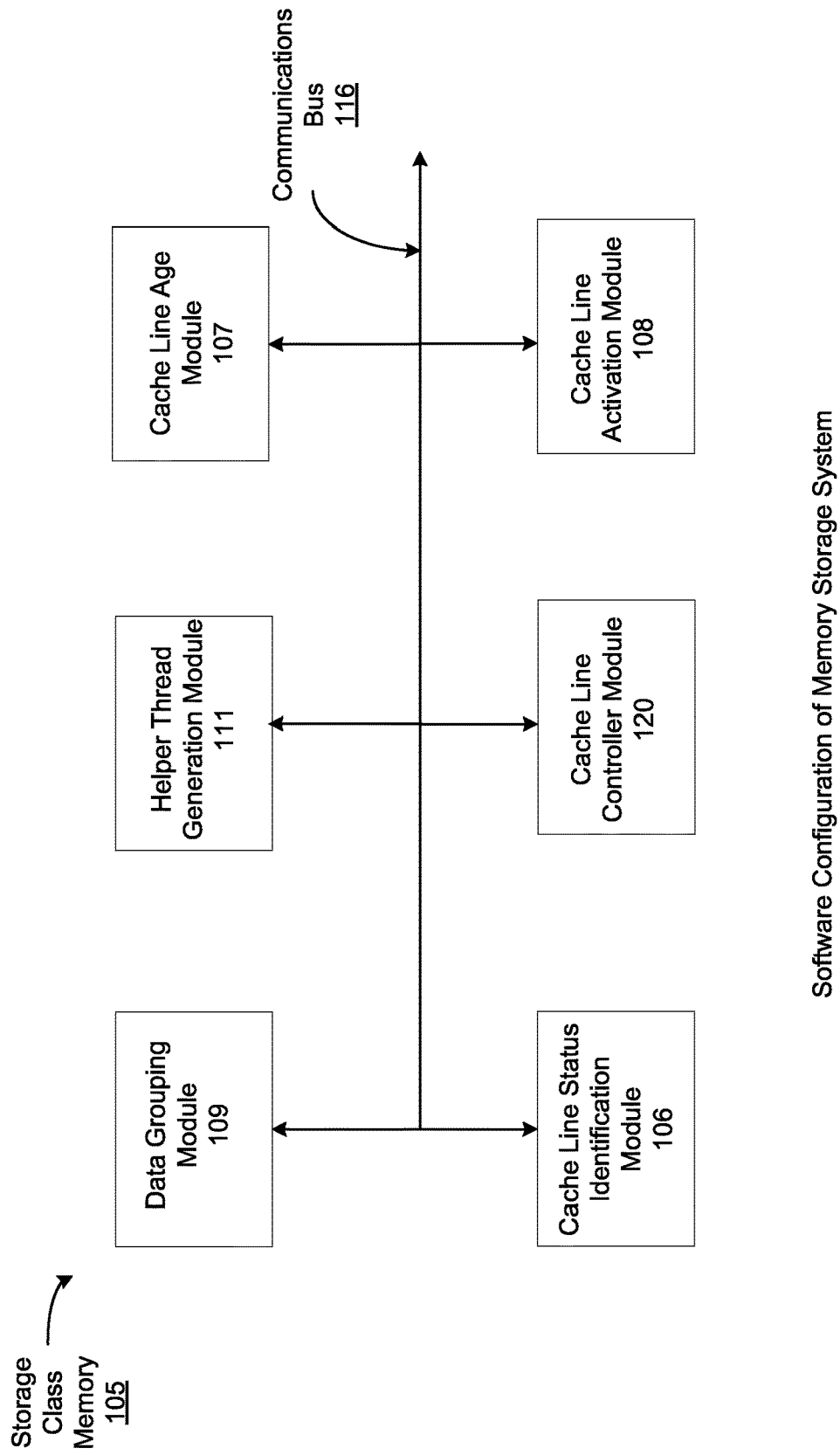
FIG. 1D is a block diagram depicting exemplary components provided in storage class memory for reducing store class memory write-backs in accordance with embodiments of the present disclosure.

FIG. 1D is a block diagram depicting exemplary components provided in storage class memory for reducing storage class memory write-backs in accordance with embodiments of the present disclosure. Although specific components are disclosed in FIG. 1D, it should be appreciated that such computer storage medium components are exemplary. That is, embodiments of the present disclosure are well-suited to having various other components or variations of the computer storage medium components recited in FIG. 1D.

It is appreciated that the components in FIG. 1D can operate with other components than those presented, and that not all of the computer storage medium components described in FIG. 1D are required to achieve the goals of the present disclosure. According to some embodiments, components depicted within FIG. 1D can be combined to achieve the goals of the present disclosure. Furthermore, it is appreciated that some hardware components described in FIGS. 1A, 1B, and/or 1C can operate in combination with some components described in FIG. 1D for purposes of achieving the goals of the present disclosure.

As depicted in FIG. 1D, storage class memory unit 105 includes cache line controller module 120, cache line status identification module 106, cache line age module 107, cache line activation module 108, data grouping module 109, and helper thread generation module 111.

Cache line controller module 120 includes the functionality to monitor core processing modules, such as core processing modules 103-1, 103-2, 103-3, and/or 103-4, as they process data requests issued from an application. Data request operations issued by applications may be, for example read data operations, write data operations, data integrity operations, etc. In response to the data request, a core processing module retrieves the requested data from cache lines included within the different cache memory levels. When data is found within a cache line, the core processing module then retrieves the sought-after data from its location within the cache memory level for further processing. In this fashion, cache line controller module 120 determines that a "cache hit" has occurred.

However, when data is not found within the different cache memory levels, the core processing module then retrieves the sought-after data from a main memory source, such as storage class memory 105, and places a duplicate of it in one of the different cache memory levels. In this fashion, cache line controller module 120 determines that a "cache miss" has occurred. As such, during the process of installing the data as a new data entry within the selected cache memory level, cache line controller module 120 identifies newly created cache lines for newer entries as well as cache lines that are selected for displacement within cache memory levels in order to make room for the new entry.

In some embodiments, cache line controller module 120 can identify cache data read and write misses. In this fashion, components of memory storage system 100 use "cache hit" or "cache miss" determinations made by cache line controller module 120 for further processing. For instance, in one embodiment, as the data grouping module 109 processes data chunks and provided a "cache miss" has occurred responsive to a core processing module's failure to locate requested data within different cache memory levels during a first read, the cache line controller module 120 can identify at least one or more recently used cache lines that are subject to displacement from within a cache memory level. In this fashion, cache line age module 107 determines that the cache lines subject to displacement are "inactive" and thus selects them for further displacement procedures. The selection of cache lines for displacement takes into account local memory system policies that identify cache lines that are relatively less active.

Data grouping module 109 includes the functionality to process computer-implemented loops configured to process a plurality of cache lines determined to be both "dirty" and/or "clean." In this fashion, data grouping module 109 splits identified loop iteration spaces into sets of different groups or data chunks. As such, each data chunk identified by data grouping module 109 includes data requests that require data read operations and data write operations for new data. The data grouping module 109 includes the functionality to identify data chunks included within a main thread process data. During these identification procedures, the data grouping module identifies both "dirty" cache lines and "clean" cache lines.

Helper threads generated by helper thread generation module 111 are threads that are separate from computer-implemented main thread data configured to process data for a cache line. As such, these helper threads are executed concurrently with main thread data and are configured to perform computer-implemented touch operations and/or invalidation procedures that can invalidate portions of the main thread data. Helper threads generated by helper thread generation module 111 are configured to selectively identify operations included within a given data chunk of a main thread data and correspondingly perform invalidation procedures. Helper thread generation module 111 includes the functionality to generate computer-implemented threads that process data chunks identified by data grouping module 109.

Cache line status identification module 106 includes the functionality to determine whether a cache line identified by cache line controller module 120 that is subject to displacement is currently "dirty" or "clean." Cache line status identification module 106 can determine that a cache line is "dirty" if data within a cache line subject to be displaced includes data that is modified within the cache line but not within storage class memory 105. Additionally, cache line status identification module 106 can determine that a cache line to be displaced is "dirty" if cache line status identification module 106 locates an identifier that indicates that contents of a cache line subject to displacement differs in some manner from a duplicate of the data included in cache line that is stored in storage class memory 105.

Additionally, the cache line status identification module 106 includes the functionality to determine whether a cache line subject to displacement is "clean" if data within the cache line includes unmodified data when compared to data stored within storage class memory 105. Additionally, cache line status identification module 106 can determine that a cache line to be displaced is "clean" if cache line status identification module 106 locates an identifier that indicates that the contents of a cache line subject to displacement is the same as a duplicate of the data included in cache line that is stored in storage class memory 105.

The cache line age module 107 includes the functionality to determine whether one or more cache lines are subject to displacement and correspondingly select them for further displacement procedures. For instance, displacement of a particular cache line can be based on an eviction policy local to a memory storage system, such as memory storage system 100. In this fashion, cache line age module 107 can determine the frequency at which a cache line subject to displacement is retrieved by a core processing module included within processor 103. For instance, cache line age module 107 includes the functionality to gauge how frequently a core processing module from processor 103, (e.g., core processing modules 103-1, 103-2, 103-3, and/or 103-4) accesses a cache line from one of the different cache memory levels.

In this fashion, cache line age module 107 includes the functionality to designate those cache lines that are accessed more frequently relative to those within a same cache memory level with an "active" or "more recently used" status (or similar indicators). Additionally, cache line age module 107 includes the functionality to designate those cache lines that are accessed less frequently relative to those within a same cache memory level with an "inactive" or "least recently used" status (or similar indicators).

In some embodiments, cache line age module 107 includes the functionality to determine whether a cache line is "active" or "inactive" when accessed more frequently relative to those cache lines stored within different cache memory levels or those stored within a main memory. Furthermore, in some embodiments, cache line age module 107 can determine cache line access frequency by locating an identifier included in the cache line that indicates that how frequently the cache line is retrieved by a core processing module from processor 103.

FIG. 2 depicts an exemplary data structure used for storing data related to reducing store class memory write-backs in accordance with embodiments of the present disclosure. With reference to the embodiment depicted in FIG. 2, data generated by components of memory storage system 100 can be stored in a data structure, such as data structure 200, for further processing. For instance, data structure 200 stores data concerning different cache lines subject to displacement, such as cache lines 201, 202, 203, 220, 221, 222, 223, etc. Also, data structure 200 stores data concerning each cache lines' respective current cache line status as determined by cache line age module 107. Moreover, as illustrated by the FIG. 2, data structure 200 stores data concerning the cache memory location level of each cache line.

Using data stored in data structure 200, cache line activation module 108 includes the functionality to manipulate cache lines stored with different cache memory levels to either maintain or restore those cache lines to an "active" or "more recently used" status. As such, cache line activation module 108 includes the functionality to perform read operations that use information generated by other components of memory storage system 100 to help it determine whether to perform manipulation procedures.

For example, when performing a read, cache line activation module 108 uses determinations made by cache line age module 107 concerning an "active" or "inactive" status related to a cache line that is subject to displacement. If the cache line is determined to be currently "active," cache line activation module 108 generally does not need to perform any manipulation of the cache line because core processing modules from processor 103 will likely perform fewer write-back procedures into storage class memory 105.

However, if the cache line is determined to be currently "inactive" by cache line age module 107, cache line activation module 108 uses determinations made by cache line status identification module 106 to determine whether the cache line subject to displacement is currently "dirty" or "clean." If the cache line is determined to be currently "dirty," cache line activation module 108 includes the functionality to calculate the ratio of dirty and clean cache lines within different levels of cache memory levels, such as level 1 cache memory, level 2 cache memory, level n cache level memory, etc. In this manner, different components of memory storage system 100 can perform further procedures based on the ratios calculated by cache line activation module 108, such as the helper thread generation module 111. For instance, cache line activation module 108 uses helper thread generation module 111 to generate helper threads configured to perform computer-implemented read operations that give the cache line the appearance that it was recently accessed by a core processing module from processor 103.

For example, using data grouping module 109 and/or helper thread generation module 111, cache line activation module 108 can perform computer-implemented "touch" operations that adjust or update data related to identified "dirty" cache lines, such as metadata or a cache line "status", in a manner that gives the modified cache line the appearance that it was recently accessed by a core processing module from processor 103. Cache line activation module 108 can be configured to perform read operations that include computer-implemented "invalidation" procedures to already identified "clean" cache lines using data grouping module 109 and/or helper thread generation module 111 that free up more cache memory space for dirty cache lines, thereby giving the modified cache line the appearance that it was recently accessed by a core processing module from processor 103.

Figure 3A:
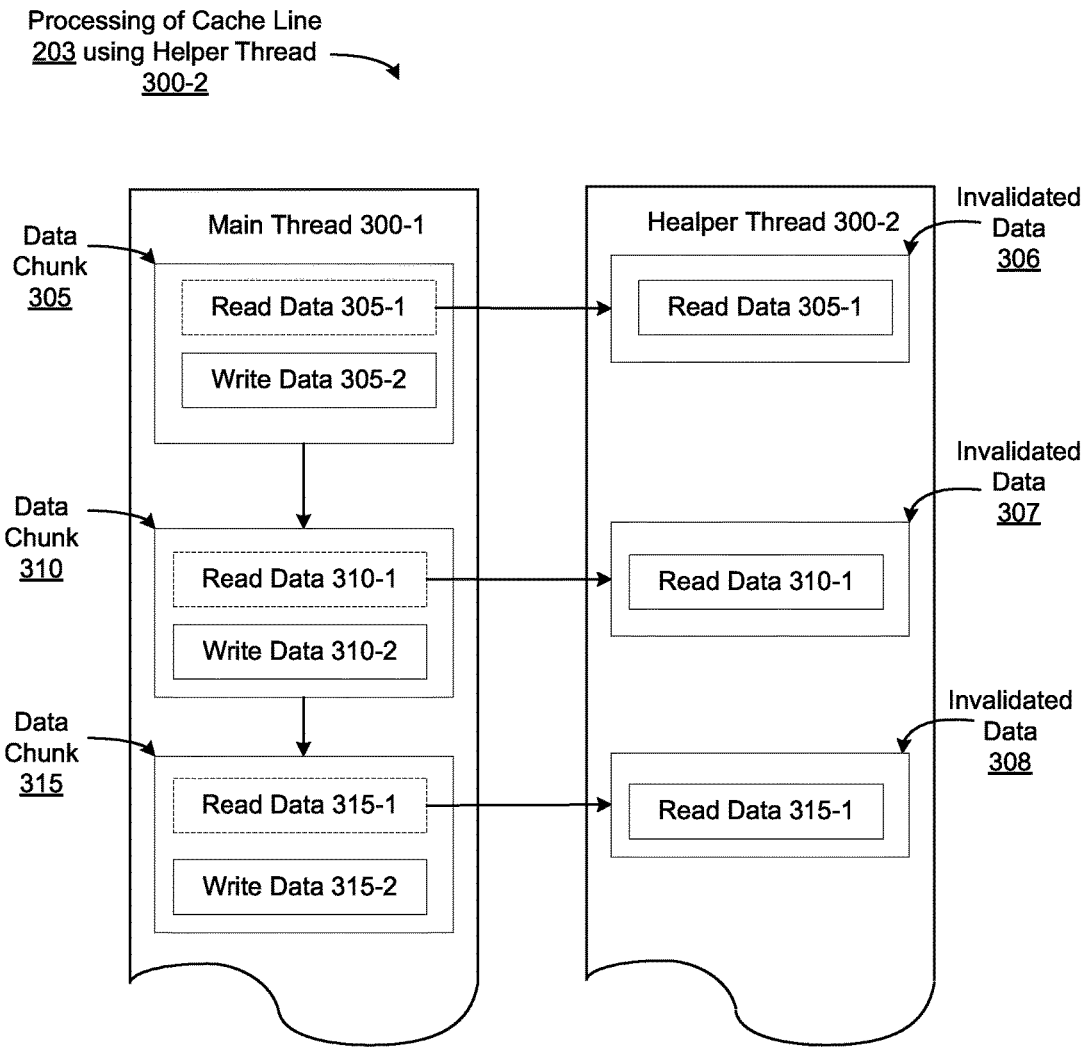
FIG. 3A depicts exemplary cache line invalidation procedures using helper threads to reduce store class memory write-backs in accordance with embodiments of the present disclosure.

FIG. 3A depicts exemplary cache line invalidation procedures using helper threads to reduce store class memory write-backs in accordance with embodiments of the present disclosure. As depicted in FIG. 3A, and with reference to FIG. 2, data grouping module 109 identifies computer-implemented loops configured to process a plurality of cache lines determined to be "clean", including cache line 203. In this fashion, data grouping module 109 splits identified loop iteration spaces into sets of different groups or data chunks, such as data chunks 305, 310, 315, etc. In this fashion, each data chunk identified by data grouping module 109 includes data requests that require data read operations, such as read data operations 305-1, 310-1, 315-1, etc., and data write operations, such as write data operations 305-2, 310-2, 315-2, etc. for new data.

Additionally, as depicted in FIG. 3A, helper thread 300-2 is a thread generated by helper thread generation module 111 that is separate from main thread 300-1, yet concurrently executed therewith, as it processes data chunks 305, 310, and 315. As illustrated in FIG. 3A, helper thread 300-1 can be configured to identify portions of main thread 300-1, such as read data operations 305-1, 310-1, and 315-1 (identification procedures by helper thread 300-2 are depicted as dashed lines around read data operations 305-1, 310-1, and 315-1 of main thread 300-1). Upon identification of these operations, helper thread 300-2 can manipulate valid bits and/or valid bit identifiers corresponding with read data operations 305-1, 310-1, and 315-1 of main thread 300-1, thereby freeing up memory space in cache.

In this fashion, helper thread 300-2 performs operations that modified cache line 203, which was previously determined to be a "clean" cache line by cache line status identification module 106 (as illustrated by the "current modification status" of cache line 202 that is stored in data structure 200 in FIG. 2) in a manner that frees up cache memory space despite data chunks 305, 310, and 315 including unmodified write data operations 305-2, 310-2, and 315-2. By performing these invalidation procedures, memory storage system 100 can create more space in a last level cache, such as level N cache level 104-N, in a manner that frees up more space for dirty cache lines and gives the modified cache line the appearance that it was recently accessed by a core processing module from processor 103.

Figure 3B:
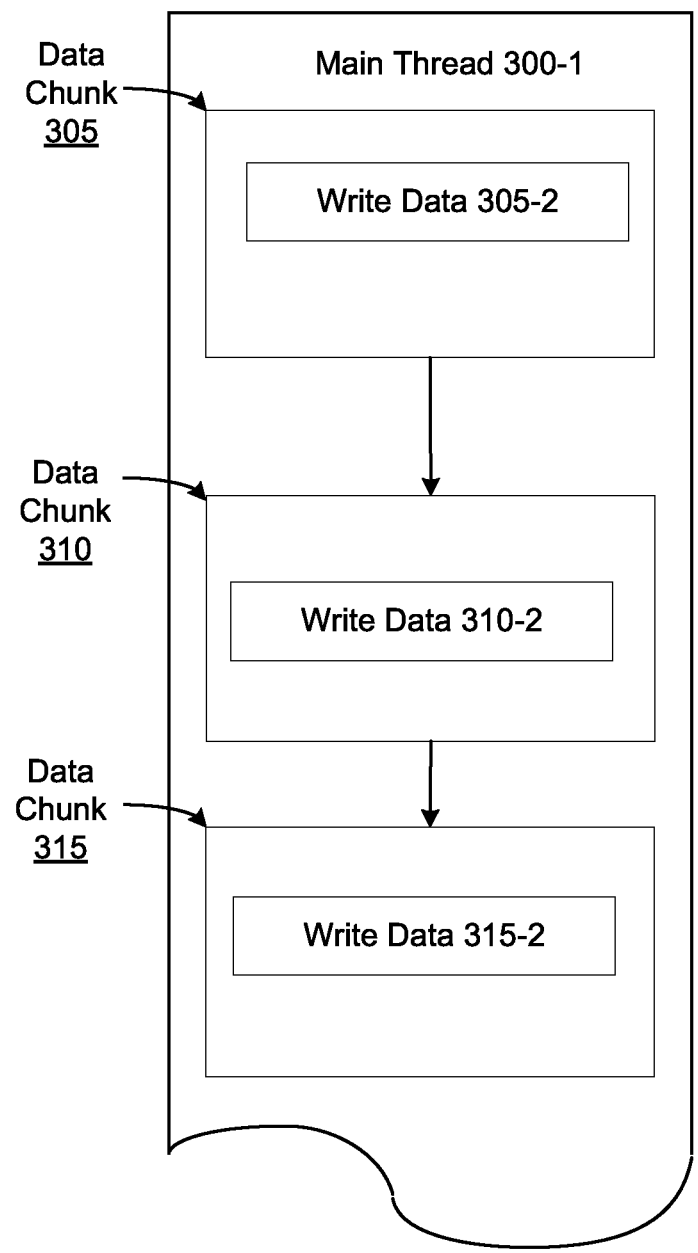
FIG. 3B depicts an exemplary resultant thread processed by a helper thread generated to assist in reducing store class memory write-backs in accordance with embodiments of the present disclosure.

FIG. 3B depicts an exemplary resultant thread processed by a helper thread generated to assist in reducing store class memory write-backs in accordance with embodiments of the present disclosure. With reference to the embodiment depicted in FIG. 3B, the invalidation of read data operations 305-1, 310-1, and 315-1 by helper thread 300-2 allows a main thread to only execute write data operations 305-2, 310-2, and 315-2 within Level 1 and/or Level 2 cache lines. Thus, memory storage system 100 performs procedures using helper threads that invalidate portions of cache levels at Level 1 and/or Level 2.

As such, when a dirty line is bound to be displaced, that displaced dirty cache line is then written back on the memory. In this fashion, the concurrent execution of helper thread 300-2 in parallel with main thread 300-1 allows memory storage system 100 to correspondingly reduce the amount of storage space utilized in level N cache level 104-N. In some embodiments, memory storage system 100 is configured to delay the performance of write-back procedures by processor 103 of data stored within the cache line until a predetermined threshold amount of "dirty" cache lines is reached.

By performing manipulation and/or invalidation procedures in the manner described herein, processor 103 delays eviction of those cache lines subject to displacement because it appears to be "active" to processor 103, irrespective of an eviction policy and/or a least recently used (LRU) policy local memory storage system 100. In this fashion, memory storage system 100 is configured to prioritize dirty cache lines over clean lines, thereby reducing the total number of write-backs performed by processor 103 into a main memory such as storage class memory 105.

Figure 3C:
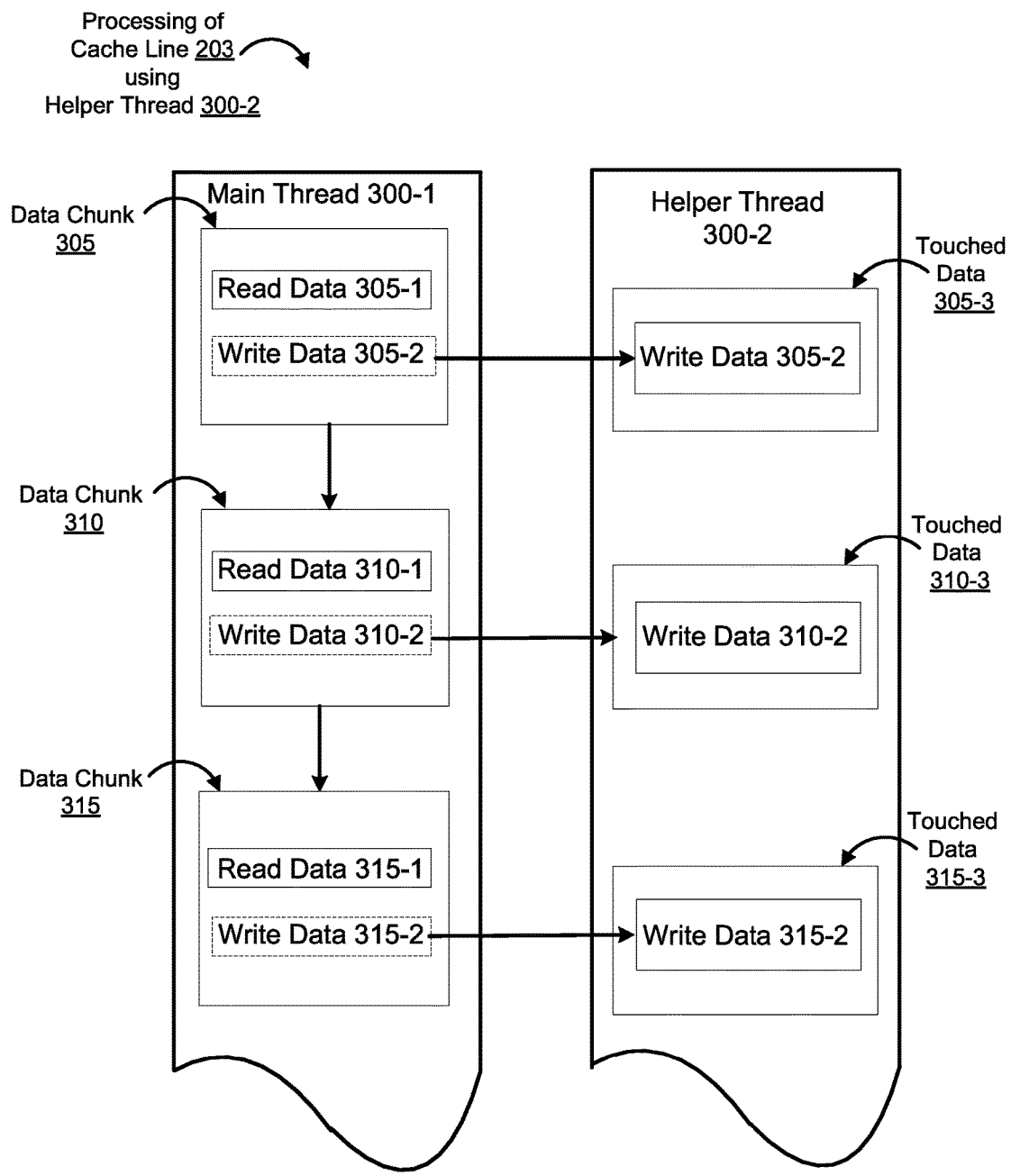
FIG. 3C depicts exemplary "touch" procedures using helper threads to reduce storage class memory write-backs in accordance with embodiments of the present disclosure.

FIG. 3C depicts exemplary "touch" procedures using helper threads to reduce storage class memory write-backs in accordance with embodiments of the present disclosure. As illustrated in FIG. 3C, helper thread 300-2 is configured to identify portions of main thread 300-1, such as write data operations 305-2, 310-2, 315-2, (identification procedures by helper thread 300-2 are depicted as dashed lines around write data operations 305-2, 310-2, 315-2 of main thread 300-1). Upon identification of these operations, helper thread 300-2 performs "touch" operations that adjust or update data related to write data operations 305-2, 310-2, 315-2, such as metadata or a cache line "status", in a manner that gives the modified cache line the appearance that it was recently accessed by a core processing module from processor 103.

As such, helper thread 300-2 touches data that has already been written by main thread 300-1. Moreover, the performance of these touch operations allows processor 103 to delay eviction of those cache lines subject to displacement because they are prioritized over clean cache lines, thereby reducing the total number of write-backs performed by processor 103 into a main memory such as storage class memory 105. For instance, in one embodiment, write data operations 305-2, 310-2, 315-2 can be prioritized in the order in which they were touched by helper thread 300-2. In this fashion, write data operation 315-2 is prioritized ahead of write data operation 310-2 as it was subject to touch operations more recently than write data operation 315-2. Similarly, write data operation 310-2 is prioritized ahead of write data operation 305-2 as it was subject to touch operations more recently than write data operation 305-2.

Figure 4:
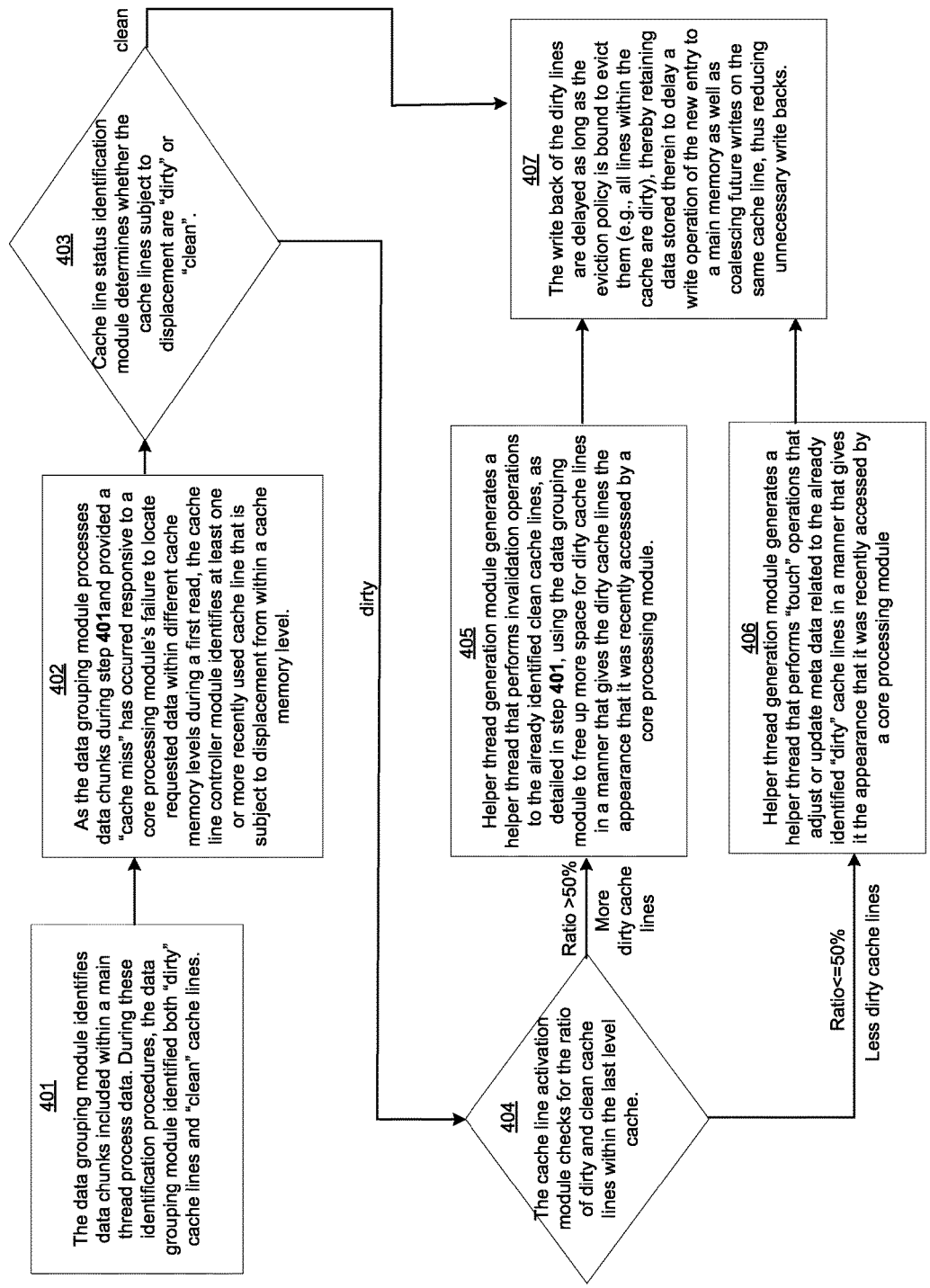
FIG. 4 is a flowchart of an exemplary process for reducing storage class memory write-backs in accordance with embodiments of the present disclosure.

FIG. 4 is a flowchart of an exemplary process for reducing storage class memory write-backs in accordance with embodiments of the present disclosure.

At step 401, the data grouping module processes data chunks included within a main thread process data. During these procedures, the data grouping module processes both "dirty" cache lines and "clean" cache lines identified by the cache line status identification module.

At step 402, as the data grouping module processes data chunks during step 401 and provided a "cache miss" has occurred responsive to a core processing module's failure to locate requested data within different cache memory levels during a first read, the cache line controller module identifies at least one or more recently used cache line that is subject to displacement from within a cache memory level.

At step 403, the cache line age module determines that the cache lines subject to displacement are "inactive" and thus selects them for further displacement procedures. Selection of cache lines for displacement takes into account local memory system policies that identify cache lines that are relatively less active. During selection procedures, the cache line status identification module determines whether the cache lines are "dirty" or "clean." If the cache lines are "dirty," the cache line activation module determines whether the ratio of dirty and clean cache lines within the last cache level is greater than 50% (or more "dirty" cache lines are stored within the last cache level than "clean" cache lines), as detailed in step 404. If the cache lines are "clean," the write back of dirty lines are delayed, as detailed in step 407.

At step 404, the cache line status identification module determines that the cache lines are "dirty" and, therefore, the cache line activation module determines whether the ratio of dirty and clean cache lines within the last cache level is greater than 50% (or more "dirty" cache lines are stored within the last cache level than "clean" cache lines). If the ratio is greater than 50%, then the helper thread generation module generates a helper thread that performs invalidation procedures, as detailed in step 405. If the ratio is less than or equal to 50%, then the helper thread generation module generates a helper thread that performs "touch" operations, as detailed in step 406.

At step 405, the cache line activation module determines that the ratio is greater than 50%, and, therefore, the helper thread generation module generates a helper thread that performs invalidation operations to the already identified clean cache lines, as detailed in step 401, using the data grouping module to free up more space for dirty cache lines in manner that gives the dirty cache lines the appearance that it was recently accessed by a core processing module.

At step 406, the cache line activation module determines that the ratio is less than or equal to 50%, and, therefore, then the helper thread generation module generates a helper thread that performs "touch" operations, the helper thread generation module generates a helper thread that performs "touch" operations that adjust or update meta data related to the already identified "dirty" cache lines in a manner that gives it the appearance that it was recently accessed by a core processing module.

At step 407, the write back of dirty lines are delayed as long as the eviction policy is bound to evict them (e.g., all lines within the cache are dirty), thereby retaining data stored therein to delay a write operation of the new entry to a main memory as well as coalescing future writes on the same cache line, thus reducing unnecessary write backs.

Although exemplary embodiments of the present disclosure are described above with reference to the accompanying drawings, those skilled in the art will understand that the present disclosure may be implemented in various ways without changing the necessary features or the spirit of the present disclosure. The scope of the present disclosure will be interpreted by the claims below, and it will be construed that all techniques within the scope equivalent thereto belong to the scope of the present disclosure.

According to an embodiment, the techniques described herein are implemented by one or more special-purpose computing devices. The special-purpose computing devices may be hardwired to perform the techniques; may include digital electronic devices, such as one or more application-specific integrated circuits (ASICs) or field programmable gate arrays (FPGAs) that are persistently programmed to perform the techniques; or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be database servers, storage devices, desktop computer systems, portable computer systems, handheld devices, networking devices, or any other device that incorporates hardwired and/or program logic to implement the techniques.

In the foregoing detailed description of embodiments of the present invention, numerous specific details have been set forth in order to provide a thorough understanding of the present invention. However, it will be recognized by one of ordinary skill in the art that the present invention is able to be practiced without these specific details. In other instances, well-known methods, procedures, components, and circuits have not been described in detail so as not to unnecessarily obscure aspects of the embodiments of the present invention.

Although a method is able to be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part.

Embodiments according to the present disclosure are thus described. While the present disclosure has been described in particular embodiments, it is intended that the invention shall be limited only to the extent required by the appended claims and the rules and principles of applicable law.

What is claimed is:

1. A method of storing data in memory, said method comprising:
   determining if a data request generates a cache miss in a memory resident on a computer system, said memory comprising a plurality of different cache memory levels and a main memory;
   identifying a first cache line subject to displacement from a first cache memory level responsive to said first cache memory level storing a new entry corresponding to said data request, wherein the identifying a first cache line subject to displacement from said first cache memory level occurs when said data request generates said cache miss in a first cache memory level of said plurality of different cache memory levels; and
   activating said first cache line within said first cache memory level to retain data stored therein to delay a write operation of said new entry to said main memory, wherein activating said first cache line further comprises generating a helper thread configured to perform touch operations on a cache memory level storing said first cache line.

2. The method of storing data in memory as described in claim 1, wherein said first cache line is dirty.

3. The method of storing data in memory as described in claim 1, wherein activating said first cache line further comprises generating a helper thread configured to perform invalidation operations on clean cache lines stored in said cache memory level.

4. The method of storing data in memory as described in claim 3, wherein generating the helper thread configured to perform invalidating operations further comprises invalidating operations of a main thread processing instructions related to said first cache line.

5. The method of storing data in memory as described in claim 3, wherein invalidating operations of a main thread further comprises performing said invalidating operations concurrent to execution of said main thread.

6. A system for storing data in memory, said system comprising:
   a memory resident on a computer system, said memory comprising a plurality of different cache memory levels and a main memory, each cache memory level comprising a plurality of different cache lines;
   a cache line controller module configured to determine if a data request generates a cache miss in a first cache memory level of said plurality of different cache memory levels, said cache line controller module configured to identify a first cache line subject to displacement from said first cache memory level responsive to said first cache memory level storing a new entry corresponding to said data request, wherein said first cache line is dirty;
   a cache line activation module configured to activate said first cache line within said first cache memory level to retain data stored therein to delay a write operation of said new entry to said main memory; and
   a helper thread generation module configured to generate a helper thread to perform touch operations on a cache memory level storing said first cache line.

7. The system for storing data in memory as described in claim 6, wherein the cache line controller module is configured to identify a first cache line subject to displacement from said first cache memory level when said data request generates said cache miss in a first cache memory level of said plurality of different cache memory levels.

8. The system for storing data in memory as described in claim 6, wherein said helper thread is configured to perform invalidation operations on clean cache lines stored in said cache memory level.

9. The system for storing data in memory as described in claim 8, wherein said helper thread is configured to invalidate operations of a main thread processing instructions related to said first cache line.

10. The system for storing data in memory as described in claim 9, wherein said helper thread is configured to invalidate operations concurrent to execution of said main thread.

11. A method of storing data in memory, said method comprising:
- receiving a data request to perform an operation using memory resident on a computer system, said memory comprising a plurality of different cache memory levels;
- performing a first read to determine if said data request generates a cache miss in a first cache memory level of said plurality of different cache memory levels;
- when said data request generates a cache miss in said first cache memory level, selecting a first cache line within said first cache memory level to store a new entry corresponding to said data request, thereby subjecting a second cache line to displacement from said first cache memory level; and
- when said second cache line currently stores a dirty entry, performing a second read of said second cache line, said second read comprising computer-implemented procedures to make said second cache line active within said first cache memory level to retain data stored therein and delay a write operation of said new entry to a second cache memory level of said plurality of different cache memory levels, wherein said performing a second read further comprises calculating a ratio between clean cache lines and dirty cache lines on a cache memory level storing said second cache line to determine performance of activation procedures, and wherein, when said cache memory level comprises less dirty cache lines than clean cache lines, generating a helper thread to perform touch operations on a cache memory level storing said second cache line.

12. The method of storing data in memory as described in claim 11, wherein, when said cache memory level comprises more dirty cache lines than clean cache lines, generating a helper thread to perform invalidation operations on a cache memory level storing said second cache line.

13. The method of storing data in memory as described in claim 12, wherein generating a helper thread configured to perform invalidating operations further comprises performing invalidation operations on clean cache lines stored in said cache memory level.

14. The method of storing data in memory as described in claim 12, wherein performing invalidation operations further comprises invalidating operations of a main thread processing instructions related to said first cache line.

* * * * *